United States Patent
Kubo et al.

(10) Patent No.: US 10,848,608 B2
(45) Date of Patent: Nov. 24, 2020

(54) INSTANTANEOUS-INTERRUPTION PREVENTION DEVICE AND TELEPHONE

(71) Applicant: NEC Platforms, Ltd., Kawasaki (JP)

(72) Inventors: Kyota Kubo, Kanagawa (JP); Masaki Kobayashi, Kawasaki (JP)

(73) Assignee: NEC Platforms, Ltd., Kawasaki (JP)

( * ) Notice: Subject to any disclaimer, the term of this patent is extended or adjusted under 35 U.S.C. 154(b) by 0 days.

(21) Appl. No.: 16/329,375

(22) PCT Filed: Jun. 5, 2018

(86) PCT No.: PCT/JP2018/021616
§ 371 (c)(1),
(2) Date: Feb. 28, 2019

(87) PCT Pub. No.: WO2018/235597
PCT Pub. Date: Dec. 27, 2018

(65) Prior Publication Data
US 2019/0199838 A1     Jun. 27, 2019

(30) Foreign Application Priority Data

Jun. 20, 2017 (JP) ................................ 2017-120077

(51) Int. Cl.
*H04M 1/08* (2006.01)
*H04M 1/06* (2006.01)
(52) U.S. Cl.
CPC ............... *H04M 1/08* (2013.01); *H04M 1/06* (2013.01)

(58) Field of Classification Search
None
See application file for complete search history.

(56) References Cited

U.S. PATENT DOCUMENTS 4,696,033 A * 9/1987 Else ................... H04M 1/08
379/424
6,212,276 B1   4/2001 Inoue et al.

FOREIGN PATENT DOCUMENTS

| CN | 201114258 Y | 9/2008 | |
| CN | 205490759 U | 8/2016 | |
| JP | 60119157 A * | 6/1985 | ............ H04M 1/06 |
| JP | 60119157 A | 6/1985 | |
| JP | 63-278449 A | 11/1988 | |
| JP | 2010-233189 A | 10/2010 | |
| WO | 0030326 A1 | 5/2000 | |

OTHER PUBLICATIONS

Communication dated Jul. 9, 2019, from the European Patent Office in application No. 18821283.1.
(Continued)

*Primary Examiner* — Quoc D Tran
(74) *Attorney, Agent, or Firm* — Sughrue Mion, PLLC

(57) ABSTRACT

Provided is an instantaneous-interruption prevention device and a telephone that can more effectively prevent instantaneous interruption of a call due to an impact. The instantaneous-interruption prevention device includes a latch part that operates so as to come into contact with a hook button of a telephone when receiving an impact, and the latch part stops motion of the hook button by coming into contact with the hook button.

8 Claims, 13 Drawing Sheets

(56) References Cited

OTHER PUBLICATIONS

Communication dated Jul. 19, 2019, from the European Patent Office in application No. 18821283.1.
International Search Report for PCT/JP2018/021616 dated Aug. 7, 2018 [PCT/ISA/210].
Communication dated Apr. 7, 2020, from the State Intellectual Property Office of the P.R. of China in Application No. 201880003360.3.

* cited by examiner

INSTANTANEOUS-INTERRUPTION PREVENTION DEVICE AND TELEPHONE

CROSS REFERENCE TO RELATED APPLICATIONS

This application is a National Stage of International Application No. PCT/JP2018/021616, filed on Jun. 5, 2018, which claims priority from Japanese Patent Application No. 2017-120077, filed on Jun. 20, 2017, the contents of all of which are incorporated herein by reference in their entirety.

TECHNICAL FIELD

The present invention relates to an instantaneous-interruption prevention device and a telephone for preventing instantaneous interruption of a call.

BACKGROUND ART

A stationary-type telephone has a handset having a microphone and a speaker and a hosing having buttons used for inputting a telephone number or the like. A hook button is provided in a place on the housing on which the handset is placed. Such a telephone performs switching of the call state such as start of a call, termination of a call, transfer of a call to a forwarding mode, or the like in response to the hook button being pressed by the handset or the user's hand.

Since a handset is typically connected to a housing via a cable, when the handset is pulled by the user, the housing will be lifted up. When the housing is then dropped, the housing may be significantly impacted. When such an impact causes the hook button to move and a switch to be unintendedly turned on or off, a call in communication may be instantaneously interrupted.

While it is possible to prevent an instantaneous interruption due to an impact by using software to control a period from the time of turning on or off of the switch to the time of switching, this is not applicable to a telephone that does not perform control of a call by software. Thus, it is desirable to provide a physical mechanism to prevent instantaneous interruption of a call due to an impact on a telephone.

Patent Literature 1 discloses the art in which a shaft of a hook button is configured to be movable along a long hole to prevent a malfunction caused when vibration or the like is applied to a telephone.

CITATION LIST

Patent Literature

PTL 1: Japanese Patent Application Laid-Open No. 2010-233189

SUMMARY OF INVENTION

Technical Problem

In the art of Patent Literature 1, however, the effect of preventing a malfunction due to an impact depends on the length of the long hole in which the shaft of the hook button is inserted. That is, if the shaft of the hook button moves and reaches the end of the long hole in response to an impact, a malfunction cannot be prevented any more. Therefore, since a hook button will operate when an impact larger than is expected is applied to the telephone, the effect of preventing a malfunction is limited.

The present invention has been made in view of the above problem and intends to provide an instantaneous-interruption prevention device and a telephone that can more effectively prevent instantaneous interruption of a call due to an impact.

Solution to Problem

One example aspect of the present invention is an instantaneous-interruption prevention device including a latch part that operates so as to come into contact with a hook button of a telephone when receiving an impact, and the latch part stops motion of the hook button by coming into contact with the hook button.

Advantageous Effects of Invention

According to the present invention, instantaneous interruption of a call due to an impact can be effectively prevented.

DESCRIPTION OF EMBODIMENTS

While example embodiments of the present invention will be described below with reference to the drawings, the present invention is not limited to the present example embodiment. Note that, throughout the drawings described below, components having the same function are labeled with the same references, and the duplicated description thereof may be omitted.

First Example Embodiment

Figure 1:
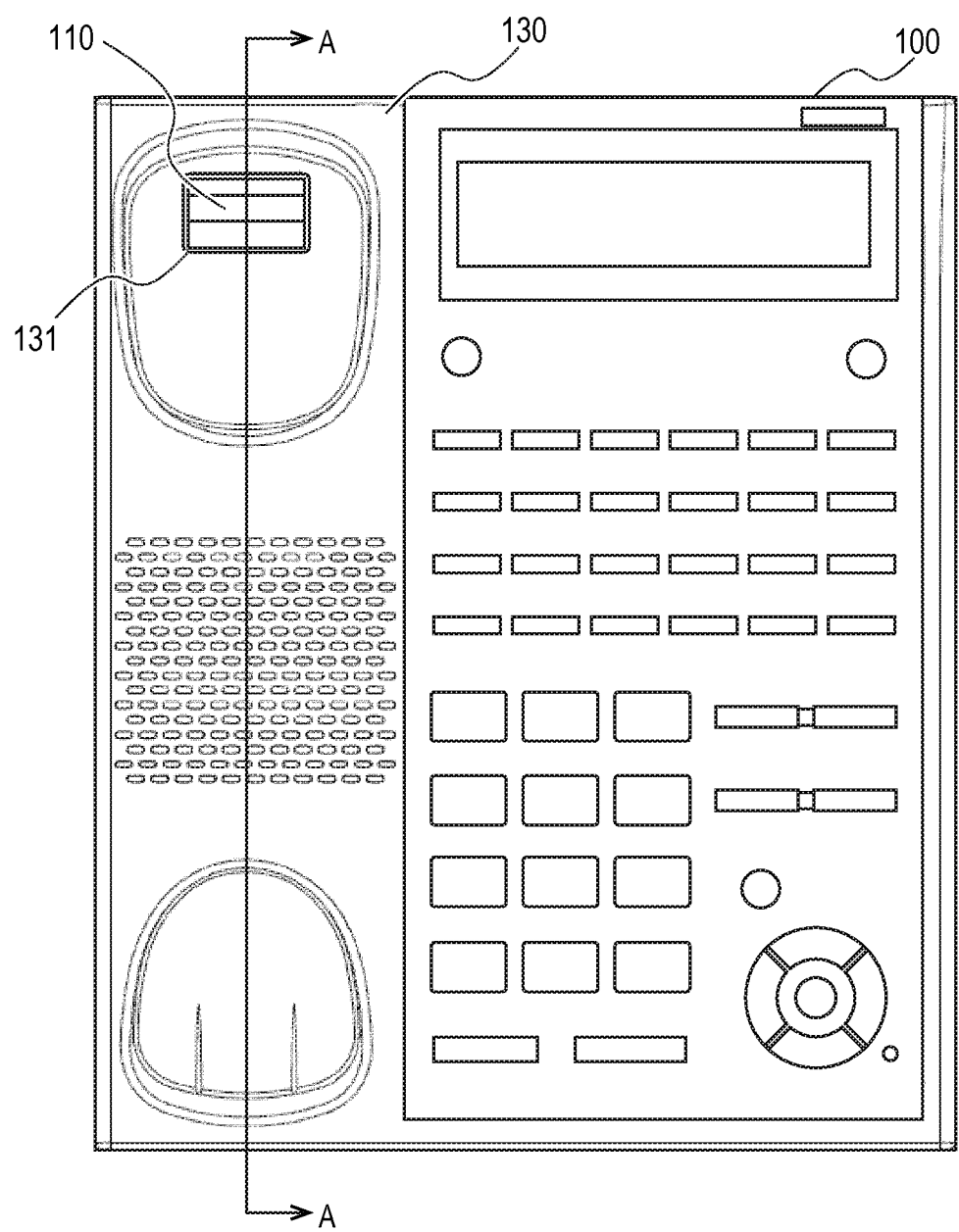
FIG. 1 is a top view of a telephone according to a first example embodiment.

FIG. 1 is a top view of a telephone 100 according to the present example embodiment. The telephone 100 has a housing 130 (housing), and a hook button 110 is provided in the housing 130. On the housing 130, buttons used for inputting a telephone number, a display used for displaying input contents, a speaker used for outputting a ring tone, and the like are provided. A through hole 131 is provided in the housing 130, and a part of the hook button 110 is exposed outside the housing 130 via the through hole 131. On the hook button 110, a handset (not illustrated) having a microphone and a speaker for a call is placed.

Figure 2:
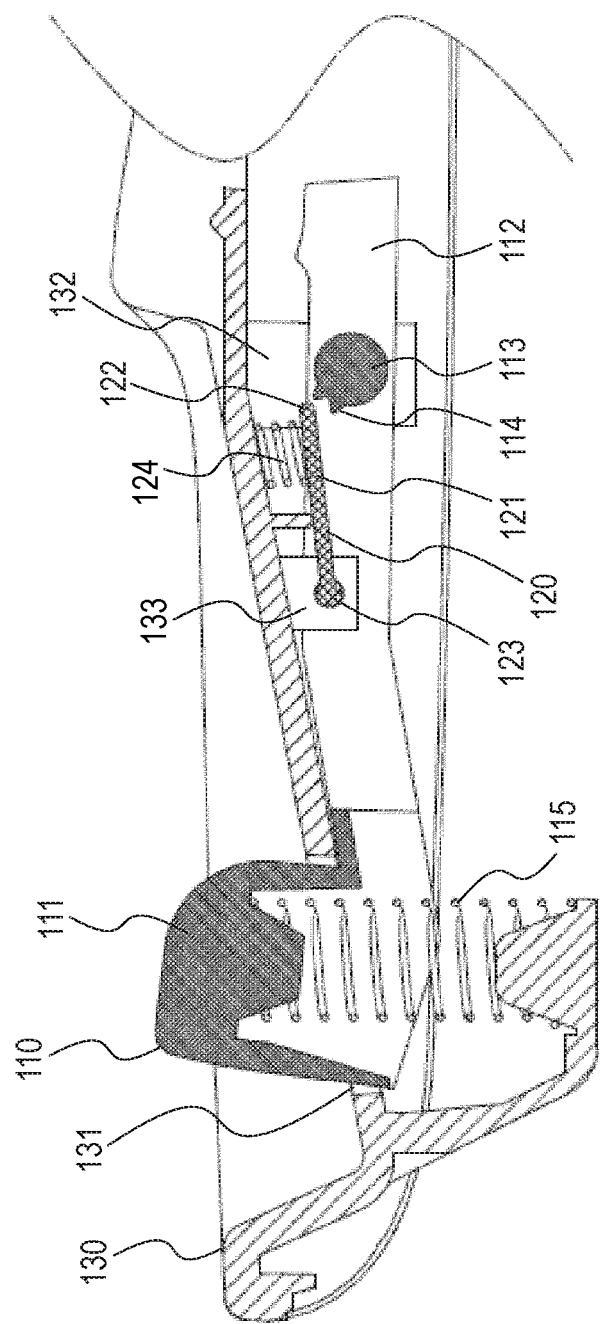
FIG. 2 is a sectional view of the telephone according to the first example embodiment.
Figure 3:
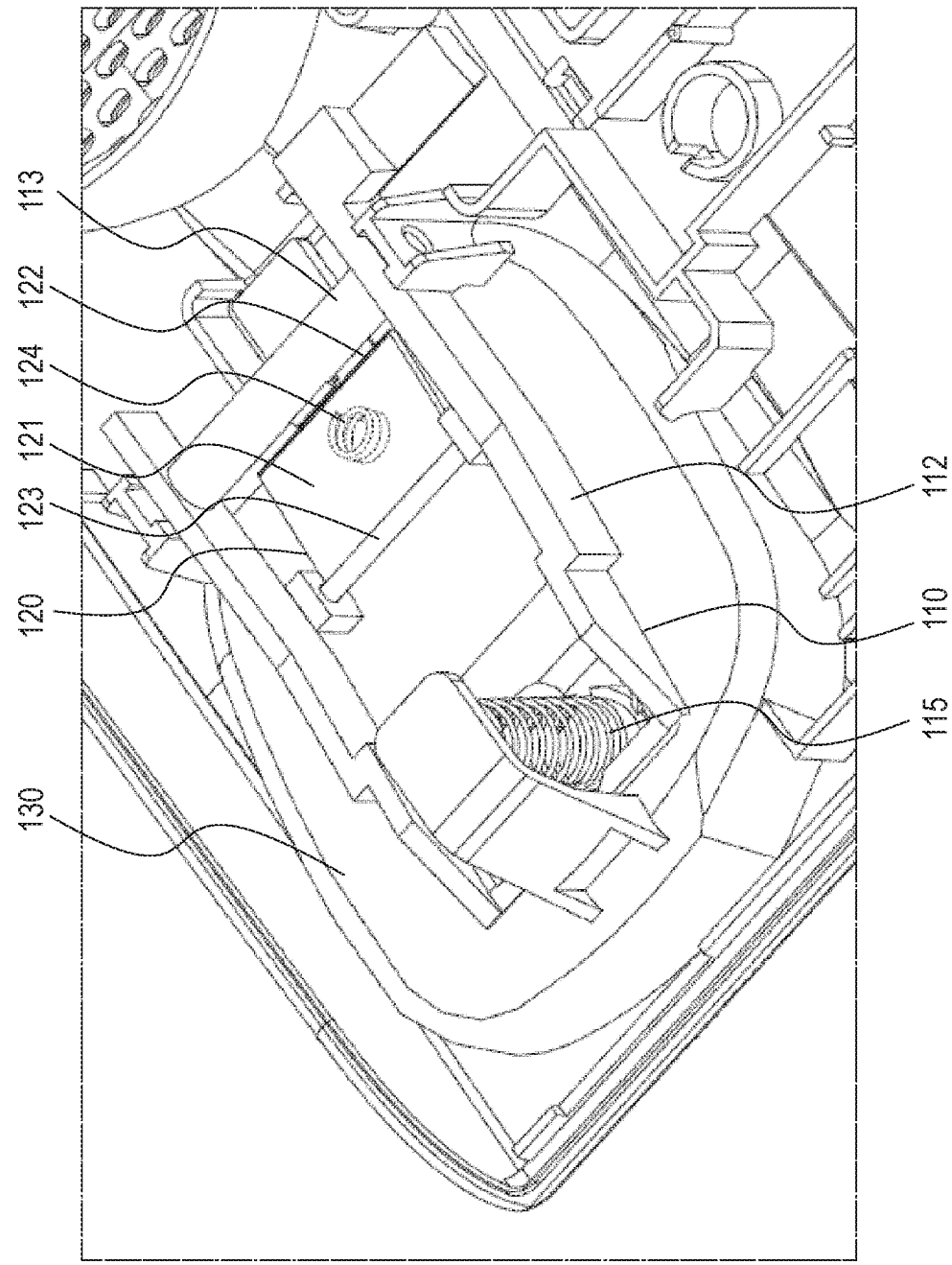
FIG. 3 is a perspective view of the peripheral structure of a stopper according to the first example embodiment.
Figure 4:
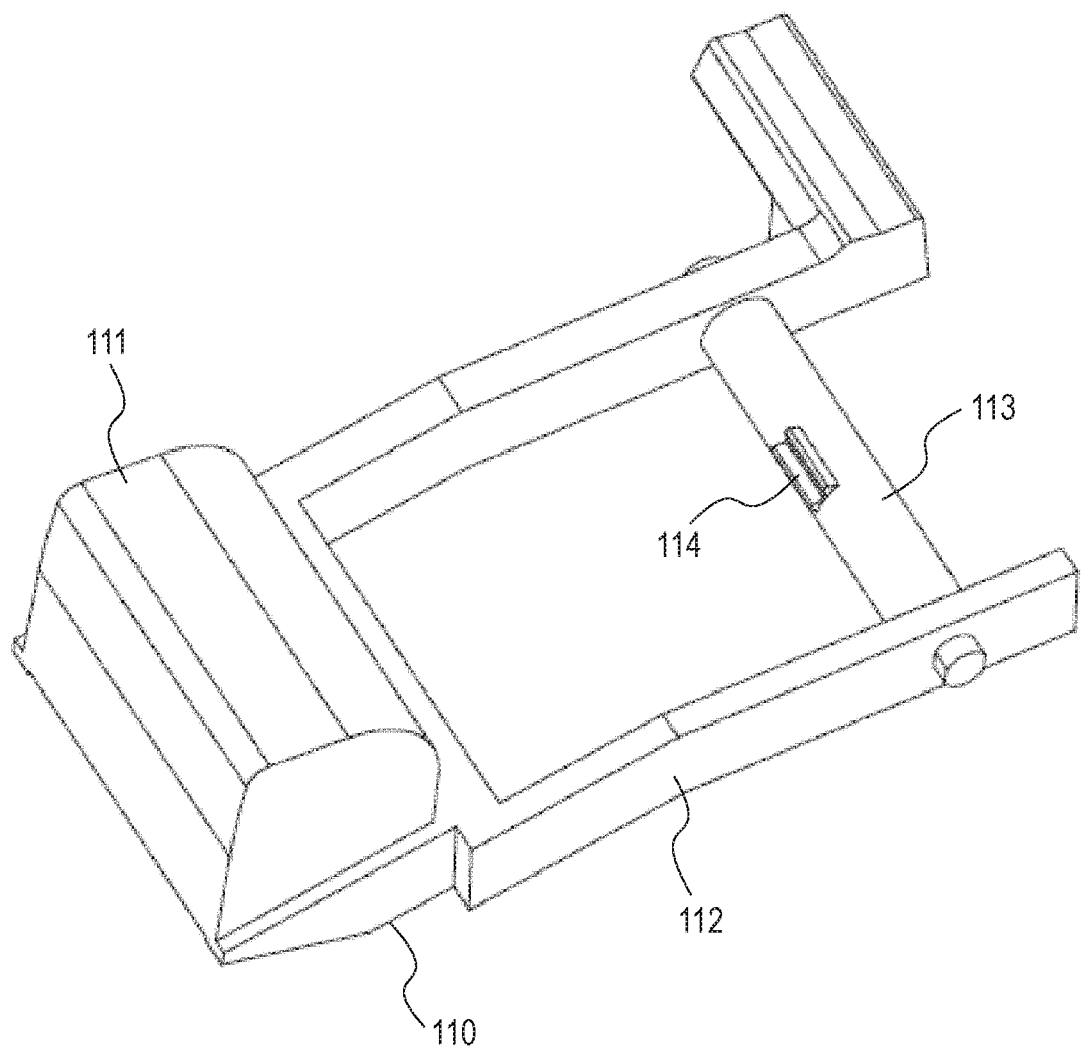
FIG. 4 is a perspective view of a hook button according to the first example embodiment.

FIG. 2 is a sectional view of the telephone 100 according to the present example embodiment when viewed from a line A-A of FIG. 1. FIG. 3 is a perspective view of the peripheral structure of a stopper 120 of the telephone 100 according to the present example embodiment. In FIG. 3, for better visibility, illustration of a part of the housing 130 covering the hook button 110 and the stopper 120 and illustration of a button portion 111 of the hook button 110 are omitted. FIG. 4 is a perspective view of the hook button 110 according to the present example embodiment.

The hook button 110 and the stopper 120 are provided in the internal space of the housing 130. The housing 130 has a bearing 132 that supports the hook button 110 so as to be able to swing and a bearing 133 that supports the stopper 120 so as to be able to swing.

The hook button 110 has the button portion 111 exposed outside the housing 130, a hook lever 112 extending from the button portion 111, and a hook shaft 113 (first shaft) used for causing the hook lever 112 to swing.

The button portion 111 is structured to come into contact with the handset placed on the housing 130. A hook spring 115 that is a push spring is provided on the backside of the button portion 111 (inside the housing 130). One end of the hook spring 115 is fixed to the button portion 111, and the other end is fixed to the housing 130. The hook spring 115 is fixed by being fitted to circle protrusions (also referred to as a circular boss) provided to the button portion 111 and the housing 130, respectively, for example.

The hook spring 115 actuates the button portion 111 outward from the housing 130. The button portion 111 projects by a predetermined thickness to the external space of the housing 130 through the through hole 131 when being pressed to the housing 130 by the hook spring 115. The actuation force of the hook spring 115 is configured to be smaller than the weight of the handset. Thus, when the handset is placed on the button portion 111, the button portion 111 moves inward to the housing 130 by the weight of the handset. Then, when the handset is removed from the button portion 111, the button portion 111 moves in the outward direction of the housing 130 by the actuation force of the hook spring 115.

The hook lever 112 is structured to extend in one direction from the button portion 111. The hook shaft 113 is provided to the hook lever 112. The hook shaft 113 has a cylindrical shape and is provided so as to project out of the side faces of the hook lever 112 on the back side and the front side in FIG. 2. The hook shaft 113 may be a separate member fixed to the hook lever 112. Alternatively, a part of the hook lever 112 may be molded in the shape of the hook shaft 113 (that is, a circle protrusion shape).

The center axis of the hook shaft 113 is set in a direction perpendicular to the moving direction of the button portion 111. The hook shaft 113 is rotatably supported by the bearing 132 of the housing 130, and the hook lever 112 swings about the hook shaft 113 in response to external force. Thereby, the button portion 111 provided to one end of the hook lever 112 moves.

A stopper reception part 114 is provided on the hook shaft 113. The stopper reception part 114 is structured to have a predetermined shape to which a latch part 122 of the stopper 120 fits described later. In the present example embodiment, the stopper reception part 114 is shaped to have two projecting parts extending in the longitudinal direction of the hook shaft 113. The stopper reception part 114 may be a separate member fixed to the hook shaft 113. Alternatively, a part of the hook shaft 113 may be molded in the shape of the stopper reception part 114. In a state where the latch part 122 of the stopper 120 fits to the stopper reception part 114, the hook shaft 113 is unable to rotate. The stopper reception part 114 can be any shape such as a convex part, a concave part, or the combination thereof, or the like as long as it can fit to the latch part 122 of the stopper 120.

Under the hook button 110, a hook switch (not illustrated) is provided. The position of the hook switch is set to any position in accordance with the configuration of the telephone 100. When the hook switch is provided on the button portion 111 side with respect to the hook shaft 113 as a reference, the hook switch is turned on by being pressed by the hook lever 112 in a state where the button portion 111 is pressed, and the hook switch is turned off by not being pressed by the hook lever 112 in a state where the button portion 111 is not pressed. When the hook switch is provided on the opposite side to the button portion 111 with respect to the hook shaft 113 as a reference, the hook switch is turned on by being pressed by the hook lever 112 in a state where the button portion 111 is not pressed, and the hook switch is turned off by not being pressed by the hook lever 112 in a state where the button portion 111 is pressed. In response to the hook switch being turned on or off, the telephone 100 starts a call, terminates a call, or transfers to a forwarding mode of a call. Without being limited to the specific configuration illustrated here, any configuration that can switch the call state of the telephone 100 in accordance with the moving state of the hook button 110 can be used.

The stopper 120 is the instantaneous-interruption prevention device according to the present example embodiment and has a movable member 121 that moves in response to an impact, the latch part 122 that comes into contact with the hook shaft 113 of the hook button 110 to stop rotation, and a stopper shaft 123 (second shaft) that causes the movable member 121 to swing. The stopper 120 is provided above the hook shaft 113.

The movable member 121 is structured to move the latch part 122 in accordance with an impact from the outside of the stopper 120. The movable member 121 has a plate-like shape, the latch part 122 is provided to one end thereof, and the stopper shaft 123 is provided to the other end thereof. The shape of the movable member 121 is not limited thereto and may be any shape such as a pillar shape.

The stopper shaft 123 has a cylindrical shape and is provided to project out of the side faces of the movable member 121 on the back side and the front side in FIG. 2. The stopper shaft 123 may be a separate member fixed to the movable member 121. Alternatively, a part of the movable member 121 may be molded in the shape of the stopper shaft 123 (that is, a circle protrusion shape).

The center axis of the stopper shaft 123 is set in a direction perpendicular to the moving direction of the movable member 121. The stopper shaft 123 is rotatably supported by the bearing 133 of the housing 130, and the movable member 121 swings about the stopper shaft 123 in response to an impact applied to the stopper 120. Thereby, the latch part 122 provided to one end of the movable member 121 moves.

A stopper spring 124 that is a pull spring is provided on the opposite side of the movable member 121 from the hook shaft 113. One end of the stopper spring 124 is fixed to the movable member 121, and the other end is fixed to the housing 130. The stopper spring 124 is fixed by being fitted to circle protrusions (also referred to as a circular boss) provided to the movable member 121 and the housing 130, respectively, for example.

The stopper spring 124 actuates the movable member 121 in a direction separating from the hook shaft 113 (that is, upward). The actuation force of the stopper spring 124 is configured to be slightly larger than the weight of the stopper 120. Thereby, the movable member 121 moves in a direction approaching the hook shaft 113 (that is, downward) in response to application of an impact to the stopper 120, and the movable member 121 returns to the original position (that is, upward) in response to removal of the impact.

The latch part 122 is structured to have a predetermined shape which fits to the stopper reception part 114 of the hook button 110. In the present example embodiment, the latch part 122 has a shape interposed between the two protrusions of the stopper reception part 114 of the hook button 110. The latch part 122 may be a separate member fixed to the movable member 121. Alternatively, a part of the movable member 121 may be molded in the shape of the latch part 122. In a state where the latch part 122 fits to the stopper reception part 114 of the hook button 110, the hook shaft 113 is unable to rotate. The latch part 122 can be any shape such as a convex part, a concave part, or the combination thereof, or the like as long as it can fit to the stopper reception part 114 of the hook shaft 113.

Figure 5A:
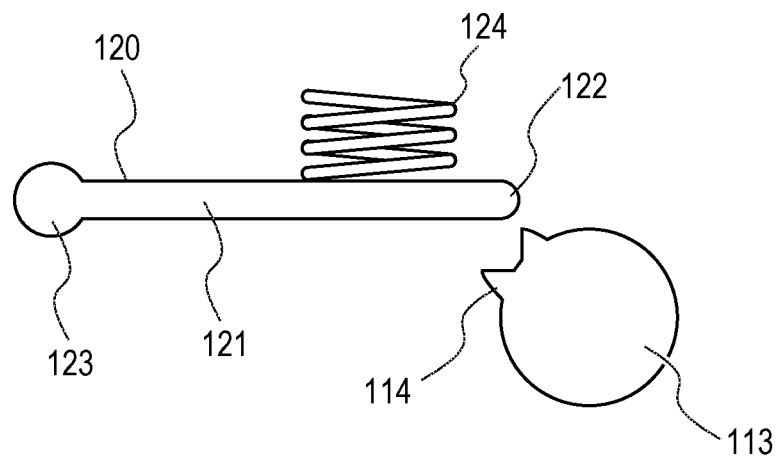
FIG. 5A is a schematic diagram illustrating the operation of the stopper according to the first example embodiment.
Figure 5B:
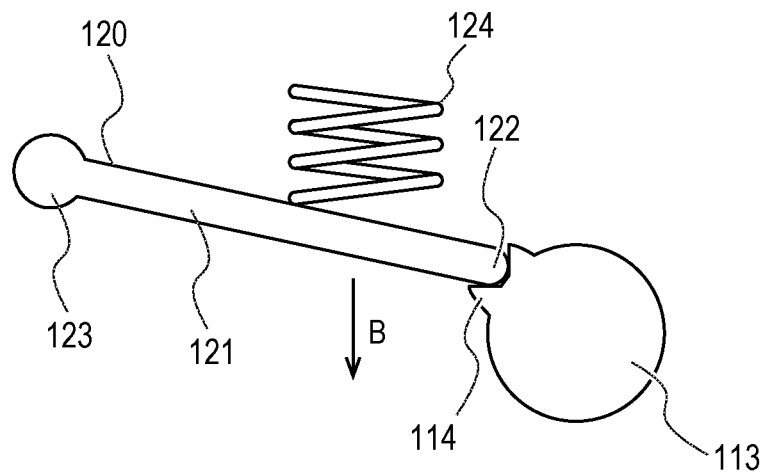
FIG. 5B is a schematic diagram illustrating the operation of the stopper according to the first example embodiment.
Figure 6A:
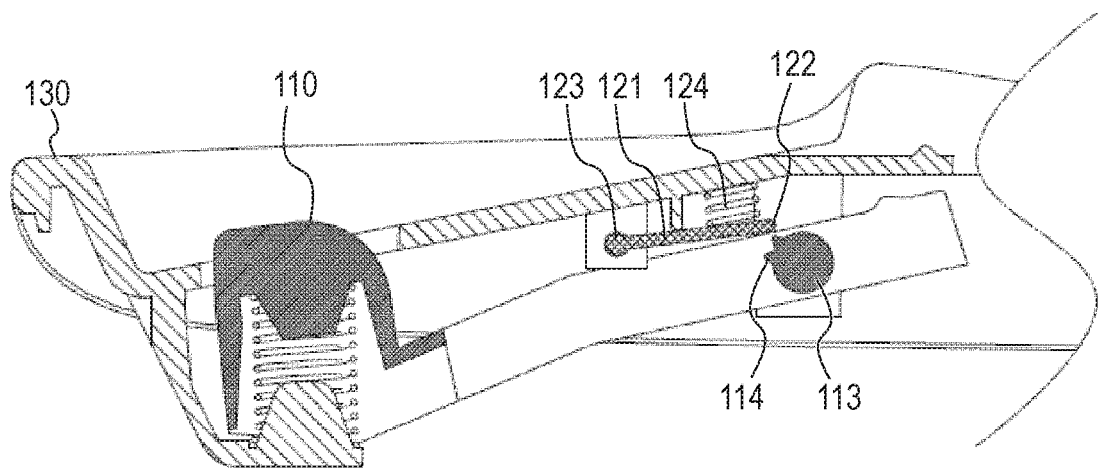
FIG. 6A is a sectional view of the telephone illustrating the operation of the stopper according to the first example embodiment.
Figure 6B:
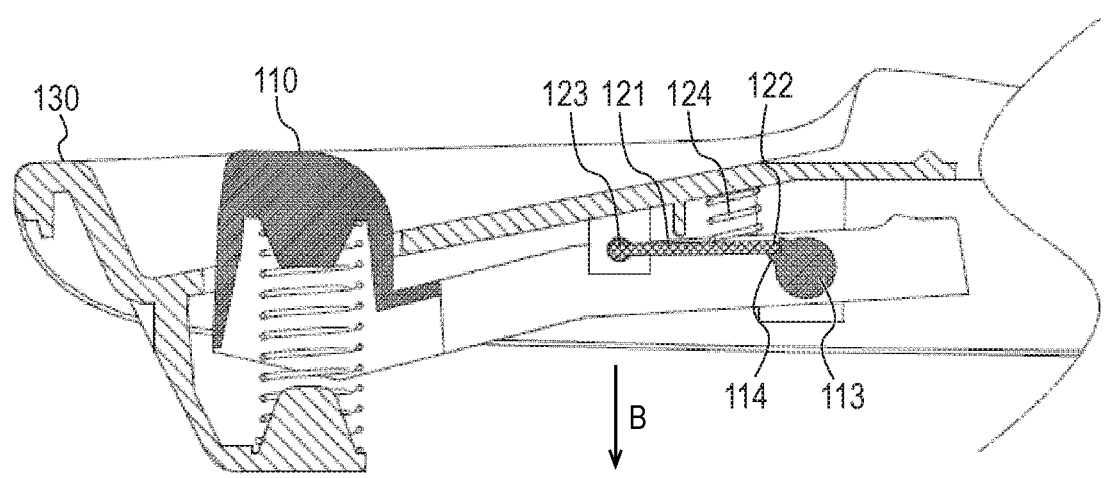
FIG. 6B is a sectional view of the telephone illustrating the operation of the stopper according to the first example embodiment.

FIG. 5A and FIG. 5B are schematic diagrams illustrating the operation of the stopper 120. FIG. 6A and FIG. 6B are sectional views of the telephone 100 illustrating the operation of the stopper 120. FIG. 5A and FIG. 6A illustrate a state where the stopper 120 is not operating, and FIG. 5B and FIG. 6B illustrate a state where the stopper 120 is operating. As illustrated in FIG. 5A and FIG. 6A, in a state where no impact is applied to the stopper 120, since the movable member 121 is actuated in the direction separating from the hook shaft 113 by the stopper spring 124, the latch part 122 is positioned at the initial position (first position) where the latch part 122 does not come into contact with the stopper reception part 114. In response to the hook button 110 being pressed in this state, the hook button 110 swings about the hook shaft 113 and switches the hook switch (not illustrated) provided under the hook button 110 to be turned on or off.

On the other hand, as illustrated in FIG. 5B and FIG. 6B, in a state where a downward impact B is applied to the stopper 120 (that is, in the press direction of the hook button 110), since the force of the impact B in addition to the weight of the movable member 121 is applied downward, the movable member 121 exceeds the upward actuation force of the stopper spring 124. Thus, the movable member 121 moves downward in response to the impact B, and the latch part 122 moves in the direction approaching the hook shaft 113 accordingly. The latch part 122 is then positioned at a latch position (second position) where the latch part 122 comes into contact with and fits to the stopper reception part 114. Since rotation of the hook shaft 113 is stopped by the latch part 122 fitting to the stopper reception part 114, the hook button 110 is unable to move downward in this state, and the impact B does not cause the hook button 110 to switch the hook switch (not illustrated) to be turned on or off. When the impact B is then removed, the movable member 121 moves upward by the actuation force of the stopper spring 124 and returns to the initial position.

As discussed above, the stopper 120 operates so as to approach and come into contact with the hook shaft 113 of the hook button 110 in response to receiving an impact and thereby is able to stop rotation of the hook shaft 113. Thereby, even when an impact is applied to the telephone 100 during a call, it is possible to prevent the hook button 110 from moving to cause an instantaneous interruption.

While the latch part 122 of the stopper 120 stops rotation of the hook shaft 113 by being fitted to the stopper reception part 114 provided to the hook shaft 113 in the present example embodiment, the configuration is not limited thereto. As long as rotation of the hook shaft 113 can be stopped, the stopper reception part 114 may not be provided. In such a case, the surface of the latch part 122 is formed of a material having a high coefficient of friction against the surface of the hook shaft 113, for example. According to such a configuration, since large frictional force occurs when the latch part 122 comes into contact with the hook shaft 113, this can obstruct rotation of the hook shaft 113 and stop motion of the hook button 110.

While the movable member 121 of the stopper 120 swings about the stopper shaft 123 and thereby causes the latch part 122 to come into contact with the hook button 110 in the present example embodiment, the configuration is not limited thereto. As long as the latch part 122 can be caused to come into contact with the hook button 110 by an impact, any other schemes can be used. For example, a rail that supports the stopper shaft 123 so as to translate in one direction may be provided to be configured to cause the movable member 121 to translate along the rail in response to an impact.

The stopper 120 according to the present example embodiment operates so as to come into contact with the hook button 110 to obstruct the movement of the hook button 110 in response to receiving an impact. Such a configuration prevents the hook button 110 from unintendedly moving and causing a call to be instantaneously interrupted even when an impact is applied to the telephone 100. Since the present example embodiment prevents instantaneous interruption of a call by using a physical mechanism, call control by software is not required.

Second Example Embodiment

While instantaneous interruption of a call is prevented by the stopper coming into contact with the rotary shaft of the hook button when receiving an impact in the first example embodiment, instantaneous interruption of a call is prevented by the stopper coming into contact with a lever of the hook button in the present example embodiment. In the present example embodiment, while the configuration of the hook button is the same as that of the first example embodiment, the configuration of the housing and the stopper is different from that of the first example embodiment.

Figure 7:
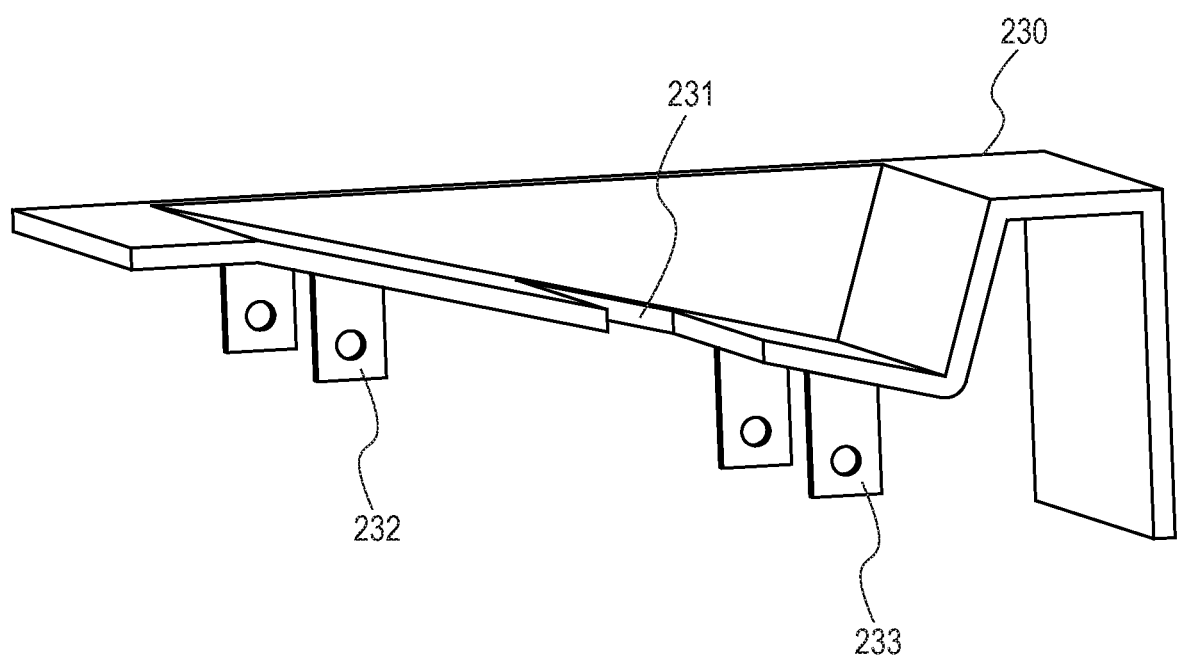
FIG. 7 is a perspective view of a housing according to a second example embodiment.

FIG. 7 is a perspective view of a housing 230 according to the present example embodiment. In FIG. 7, only the peripheral portion of the hook button of the housing 230 is illustrated, and illustration of other portions is omitted.

Further, for better visibility, illustration of a portion in front of a through hole 231 of the housing 230 is omitted.

The through hole 231 by which the hook button 110 is exposed outside the housing 230 is provided in the housing 230. Furthermore, the housing 230 has a bearing 232 that supports the hook button 110 so as to be able to swing and a bearing 233 that supports a stopper 220 described later so as to be able to swing.

Figure 8:
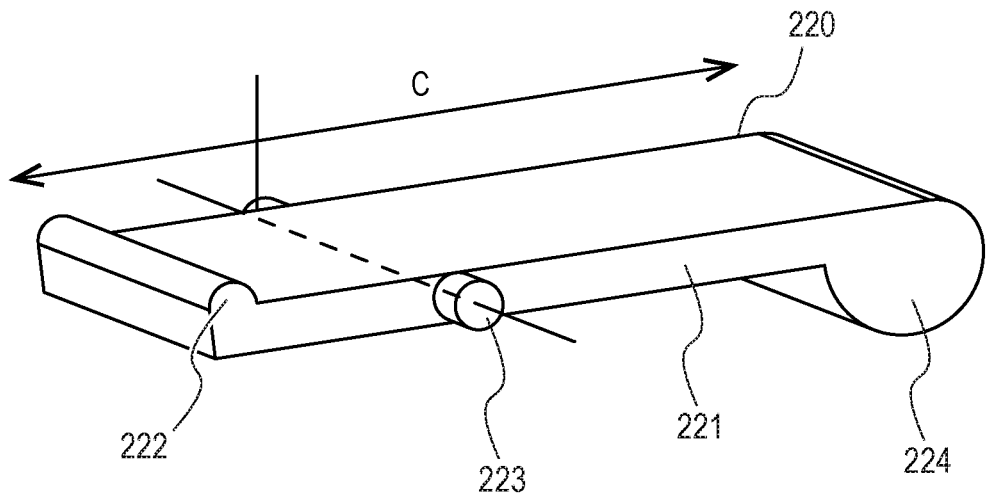
FIG. 8 is a perspective view of a stopper according to the second example embodiment.

FIG. 8 is a perspective view of the stopper 220 according to the present example embodiment. The stopper 220 is the instantaneous-interruption prevention device according to the present example embodiment and has a movable member 221 that moves in response to an impact, the latch part 222 that comes into contact with the hook lever 112 of the hook button 110 to stop rotation, and a stopper shaft 223 that causes the movable member 221 to swing.

The movable member 221 is structured to move the latch part 222 in response to an impact from the outside of the stopper 220. The movable member 221 has a plate-like shape, the latch part 222 is provided to one end thereof, and a weight part 224 is provided to the other end thereof. A stopper shaft 223 is provided on the side face of the movable member 221 between the latch part 222 and the weight part 224. The shape of the movable member 221 is not limited thereto and may be any shape such as a pillar shape.

The stopper shaft 223 has a cylindrical shape and is provided to project out of the side faces of the movable member 221 on the back side and the front side in FIG. 8. The stopper shaft 223 may be a separate member fixed to the movable member 221. Alternatively, a part of the movable member 221 may be molded in the shape of the stopper shaft 223 (that is, a circle protrusion shape).

The center axis of the stopper shaft 223 is set in a direction perpendicular to the moving direction of the movable member 221. The stopper shaft 223 is rotatably supported by the bearing 233 of the housing 230. The weight balance in the longitudinal direction C of the movable member 221 is set such that the weight part 224 side is heavier than the latch part 222 side with respect to the stopper shaft 223 as a reference. In addition, the weight balance is set such that the latch part 222 side is heavier than the weight part 224 side when the handset is placed on the hook button 110 and the weight of the handset is applied to the latch part 222. In order that the latch part 222 adjusts the weight balance, the weight part 224 may be larger than the latch part 222, or the weight part 224 may be formed by a material having a larger specific gravity than that of the latch part 222. With such a configuration, when an impact is applied to the stopper 220, the weight part 224 moves downward, and thereby the latch part 222 applies force upward to latch the hook lever 112 of the hook button 110.

Figure 9:
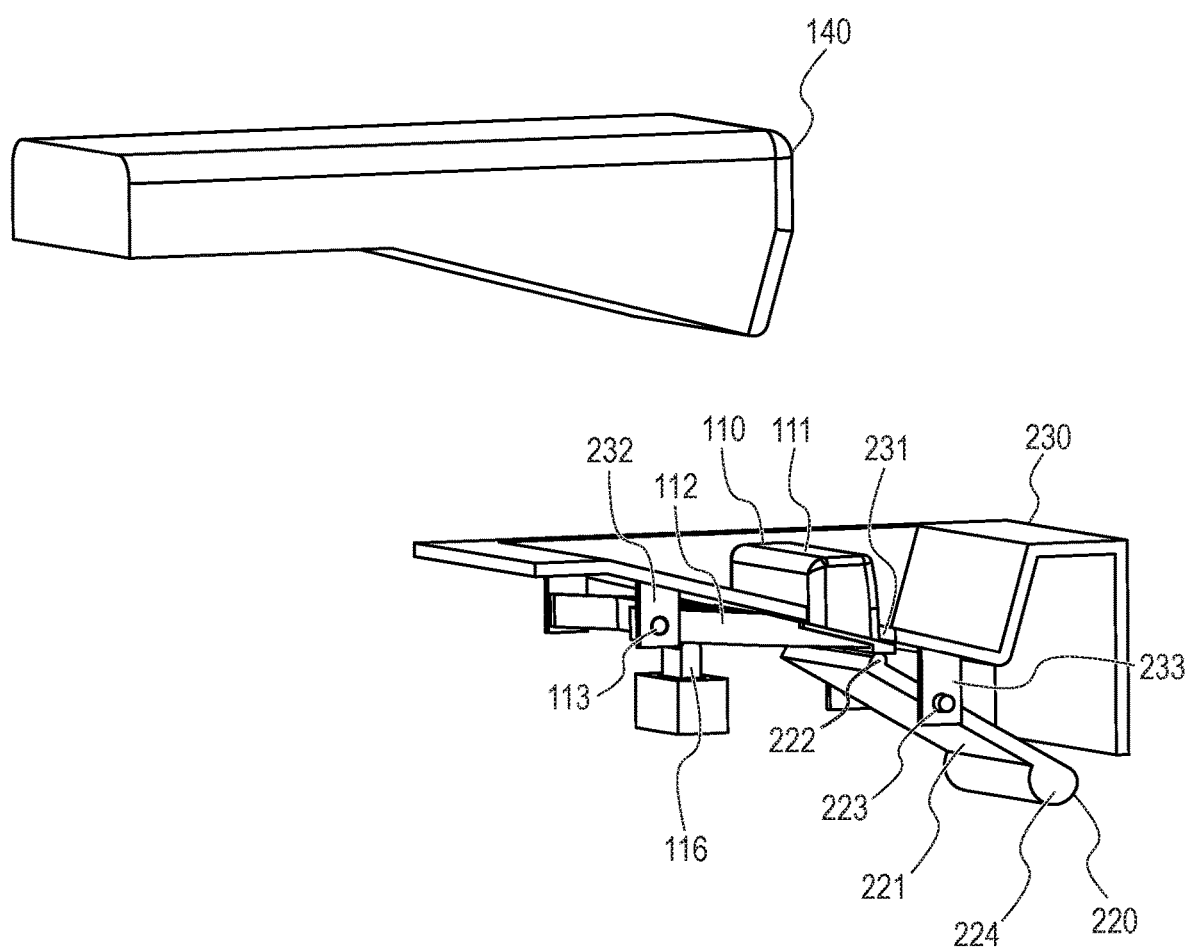
FIG. 9 is a perspective view of the peripheral structure of the stopper according to the second example embodiment.

FIG. 9 is a perspective view of the peripheral structure of the stopper 220 according to the present example embodiment. The hook button 110 is provided such that the button portion 111 is exposed outside the housing 230 from the through hole 231 of the housing 230. The hook switch 116 is provided under the hook button 110. The hook switch 116 is here provided on the side closer to the button portion 111 with respect to the hook shaft 113 as a reference. The counterforce of the hook switch 116 (that is, force in a direction by which the hook switch 116 is turned off) is set to be larger than the weight of the hook button 110 and smaller than the sum of the weight of the hook button 110 and the weight of the handset 140. Thus, the hook switch 116 is pressed by the hook lever 112 and turned on in a state where the handset 140 is placed on the button portion 111, and the hook switch 116 is not pressed by the hook lever 112 and turned off in a state where the handset 140 is removed. The conditions where the hook switch 116 is turned on or off may be changed depending on the place where the hook switch 116 is mounted.

The stopper 220 is provided under the hook button 110. The position of the stopper 220 is set such that the latch part 222 lifted upward comes into contact with the hook lever 112.

Figure 10A:
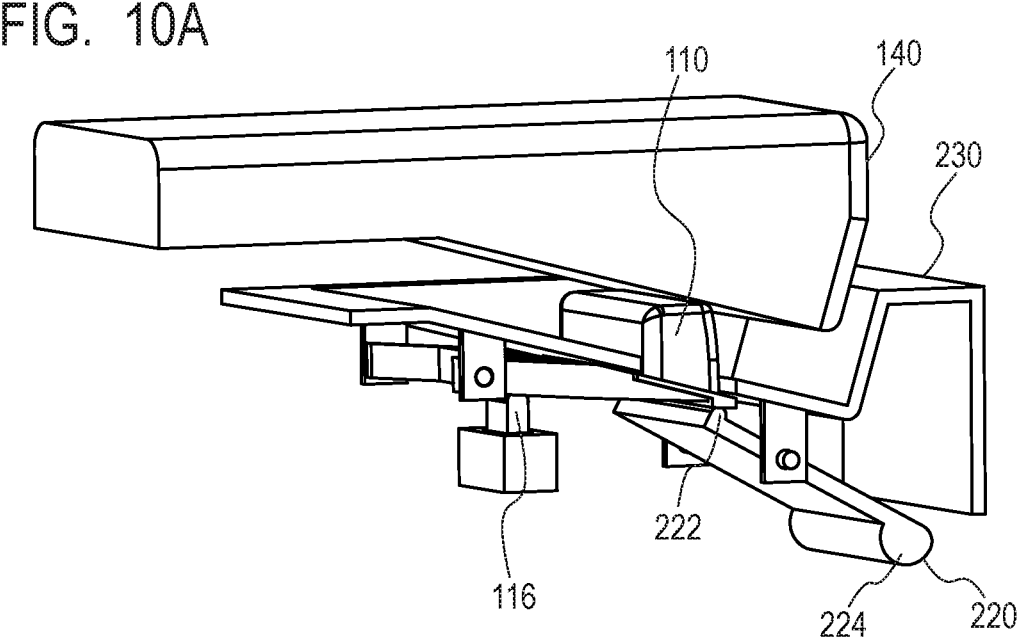
FIG. 10A is a perspective view of the peripheral structure of the stopper when no impact is applied according to the second example embodiment.
Figure 10B:
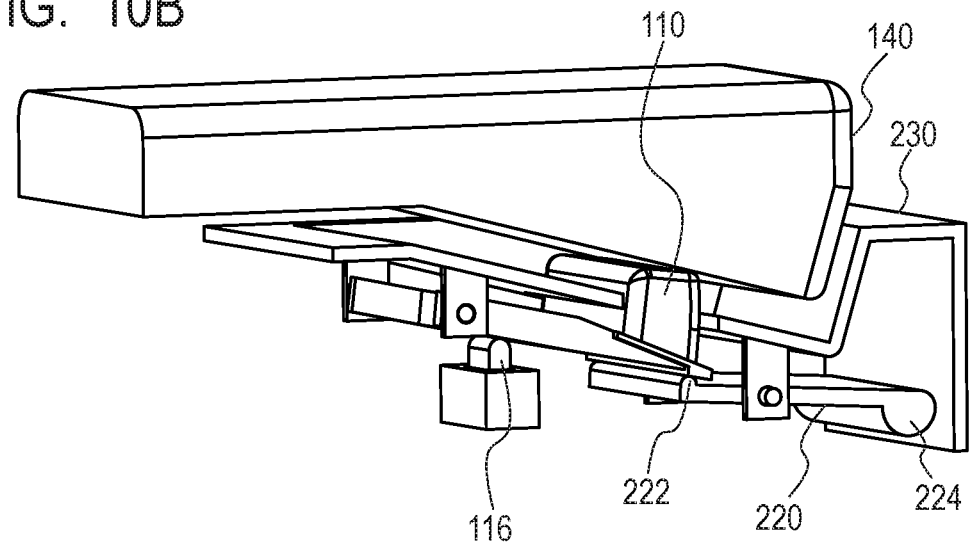
FIG. 10B is a perspective view of the peripheral structure of the stopper when no impact is applied according to the second example embodiment.
Figure 10C:
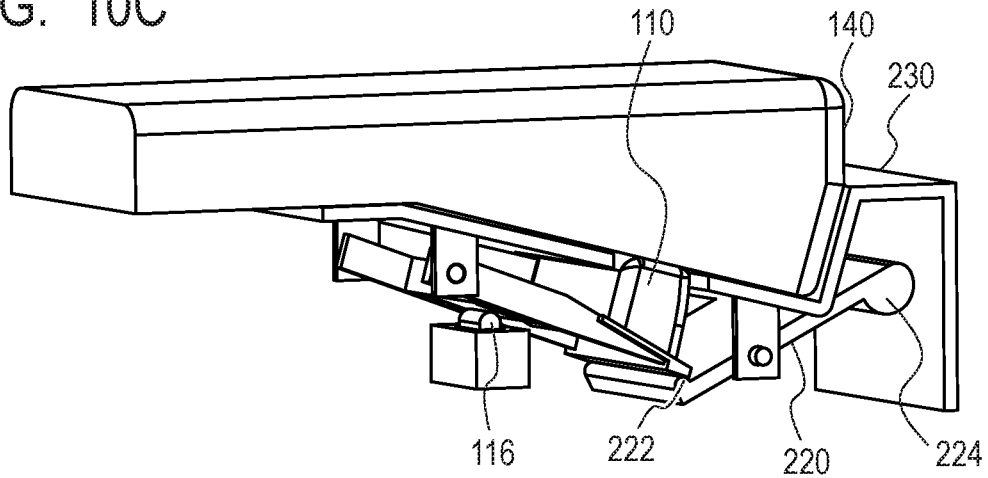
FIG. 10C is a perspective view of the peripheral structure of the stopper when no impact is applied according to the second example embodiment.

FIG. 10A to FIG. 10C are perspective views of the peripheral structure of the stopper 220 when no impact is applied. FIG. 10A illustrates a state before the handset 140 is placed on the hook button 110. In this state, since the weight part 224 side is heavier than the latch part 222 side in the stopper 220, the latch part 222 is lifted upward. Further, the hook button 110 is lifted upward by the counterforce of the hook switch 116.

FIG. 10B illustrates a state where the handset 140 is on the way to be placed on the hook button 110. In this state, since the weight of the handset 140 is applied to the hook button 110, the hook switch 116 is pressed. Further, the stopper 220 is also pressed downward by the weight of the handset 140.

FIG. 10C illustrates a state after the handset 140 has been placed on the hook button 110. In this state, the hook switch 116 is fully pressed, the hook button 110 is stopped, and thereby the stopper 220 is stopped. When the handset 140 is then removed from the hook button 110, the state returns to the state of FIG. 10A.

Figure 11:
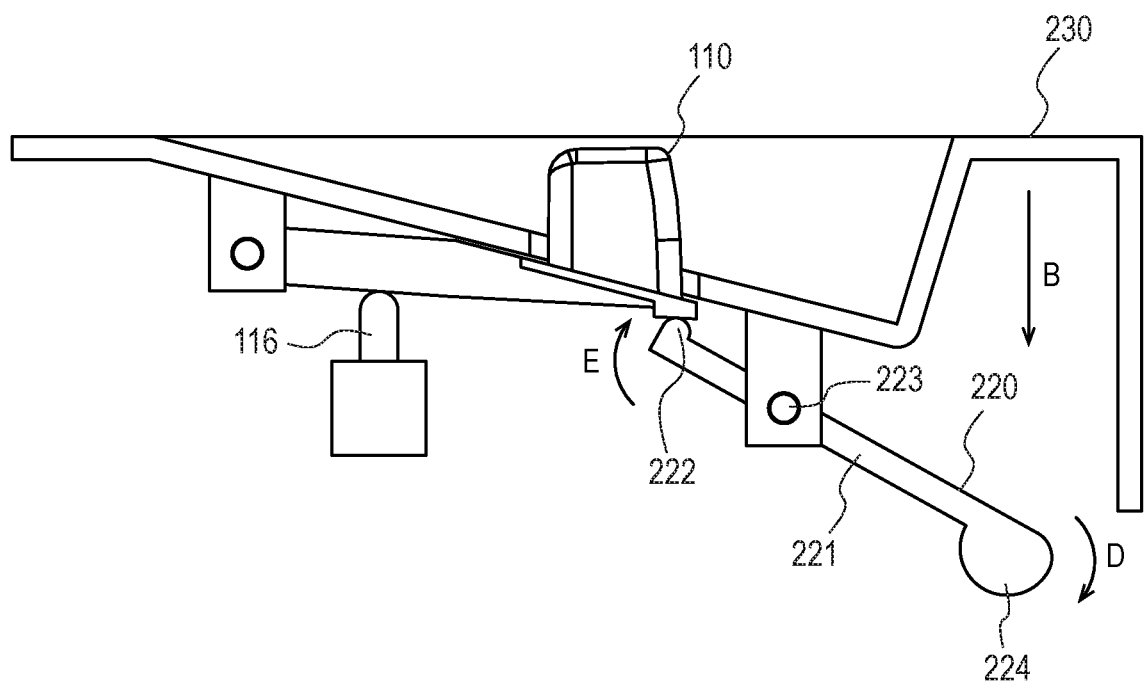
FIG. 11 is a perspective view of the peripheral structure of the stopper when an impact is applied according to the second example embodiment.

FIG. 11 is a side view of the peripheral structure of the stopper 220 when an impact is applied. In FIG. 11, for better visibility, illustration of a part in front of the hook button 110 of the housing 230 is omitted. When the downward impact B is applied to the stopper 220 (that is, in the press direction of the hook button 110), since the weight balance of the movable member 221 is set such that the weight part 224 side is heavier than the latch part 222 side, the movable member 221 swings about the stopper shaft 223 clockwise in FIG. 11. Thereby, the latch part 222 moves in the upward direction E at the same time as the weight part 224 moves in the downward direction D. With such an operation of the stopper 220, the latch part 222 comes into contact with the hook button 110, and the hook button 110 is latched upward. In this state, the hook button 110 is unable to move downward, and the impact B does not cause the hook button 110 to switch the hook switch 116 to be turned on or off.

Note that the reason why the downward impact B becomes a problem is that the upward impact (that is, the opposite direction of the press direction of the hook button 110) does not switch the hook switch 116 to be turned on or off and therefore does not cause instantaneous interruption of a call.

Figure 12A:
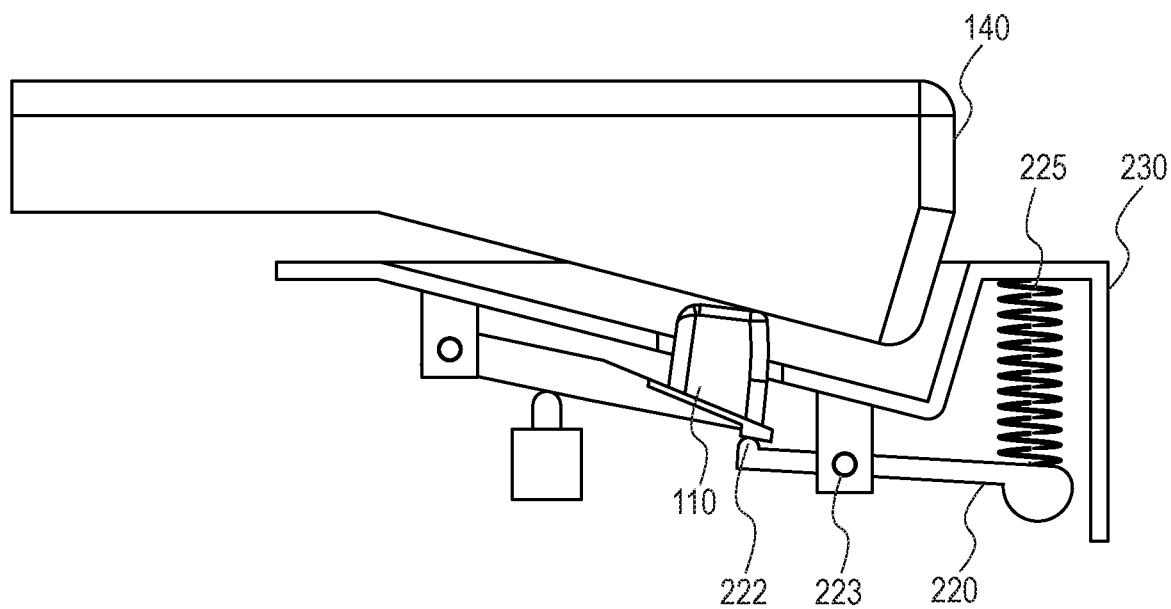
FIG. 12A is a side view of a modified example of a stopper according to the second example embodiment.

Since the stopper 220 is fixed by only the stopper shaft 223, beat noise may occurs due to vibration or the like. To prevent this, a spring 225 may be provided to the stopper 220 as illustrated in FIG. 12A. One end of the spring 225 is fixed to the stopper 220, and the other fixed to the housing 230. The spring 225 is a pull spring or a push spring, and the actuation force thereof is set as appropriate taking the weight balance of the stopper 220 into consideration. The weight balance is adjusted by the spring 225, and thereby occurrence of beat noise due to vibration or the like can be suppressed.

Figure 12B:
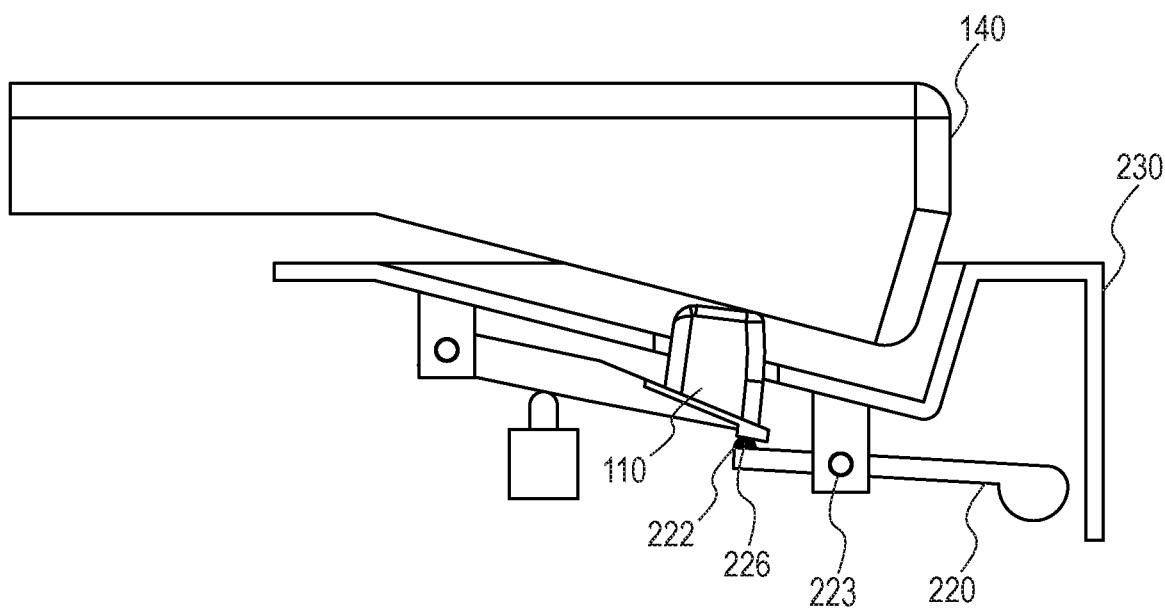
FIG. 12B is a side view of a modified example of a stopper according to the second example embodiment.

Further, the stopper 220 may have a vibration isolation rubber 226 provided to a part contacting with the hook button 110 (that is, the surface of the latch part 222) as illustrated in FIG. 12B. This can suppress occurrence of beat noise due to vibration or the like.

In the same manner as the first example embodiment, in response to being impacted, the stopper 220 according to the present example embodiment operates so as to come into contact with the hook button 110 to obstruct motion of the hook button 110. Such a configuration can prevent the hook button 110 from unintendedly moving and causing a call to be instantaneously interrupted even when an impact is applied to the telephone 100. Since the present example embodiment prevents instantaneous interruption of a call by using a physical mechanism, call control by software is not required.

Other Example Embodiments

Figure 13:
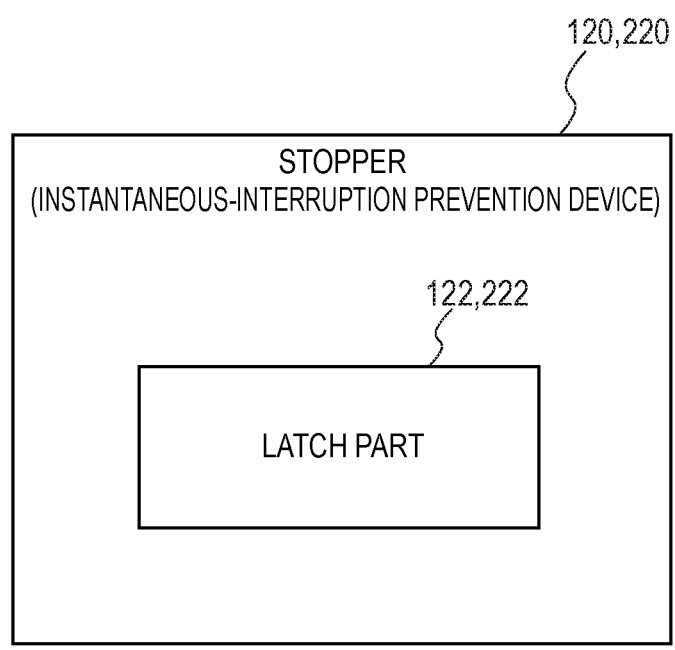
FIG. 13 is a general configuration diagram of the telephone according to each example embodiment.

FIG. 13 is a general configuration diagram of the instantaneous-interruption prevention device according to each example embodiment described above. FIG. 13 illustrates a configuration example of the instantaneous-interruption prevention device that can more effectively prevent instantaneous interruption of a call due to an impact. The stoppers 120 and 220 have the latch parts 122 and 222, respectively, which operate so as to come into contact with the hook button of the telephone when receiving an impact, and each of the latch parts stops motion of the hook button by coming into contact with the hook button.

The present invention is not limited to the example embodiments described above and may be changed as appropriate in a scope not departing from the spirit of the present invention.

The whole or part of the example embodiments disclosed above can be described as, but not limited to, the following supplementary notes.

(Supplementary Note 1)

An instantaneous-interruption prevention device comprising a latch part that operates so as to come into contact with a hook button of a telephone when receiving an impact,
wherein the latch part stops motion of the hook button by coming into contact with the hook button.

(Supplementary Note 2)

The instantaneous-interruption prevention device according to supplementary note 1,
wherein the hook button is configured to swing about a first shaft, and
wherein the latch part stops motion of the hook button by coming into contact with the first shaft.

(Supplementary Note 3)

The instantaneous-interruption prevention device according to supplementary note 2,
wherein a reception part is provided to the first shaft, and
wherein the latch part stops motion of the hook button by fitting to the reception part.

(Supplementary Note 4)

The instantaneous-interruption prevention device according to supplementary note 2 or 3 further comprising a pull spring that causes the latch part to be separated from the first shaft when not receiving the impact.

(Supplementary Note 5)

The instantaneous-interruption prevention device according to any one of supplementary notes 2 to 4, wherein the latch part is provided above the first shaft and is configured to swing about a second shaft when receiving the impact.

(Supplementary Note 6)

The instantaneous-interruption prevention device according to supplementary note 1,
wherein the hook button has a button portion exposed outside the telephone and a hook lever extending from the button portion inside the telephone, and
wherein the latch part stops motion of the hook button by coming into contact with the hook lever.

(Supplementary Note 7)

The instantaneous-interruption prevention device according to supplementary note 6,
wherein the latch part is provided under the hook lever and configured to swing about a second shaft when receiving the impact,
the instantaneous-interruption prevention device further comprising:
a weight part provided on an opposite side to the latch part with respect to the second shaft as a reference,
wherein a weight balance is set such that the weight part side is heavier than the latch part side with respect to the second shaft as a reference.

(Supplementary Note 8)

A telephone comprising:
a hook button; and
the instantaneous-interruption prevention device according to any one of supplementary notes 1 to 7.

As described above, while the present invention has been described with reference to the example embodiments, the present invention is not limited to the example embodiments described above. Various modifications that can be appreciated by those skilled in the art within the scope of the present invention can be made to the configuration or the details of the present invention.

REFERENCE SIGNS LIST

100 telephone
110 hook button
112 hook lever
113 hook shaft
114 stopper reception part
120, 220 stopper
122, 222 latch part
123, 223 stopper shaft
124 stopper spring
224 weight part

The invention claimed is:

1. An instantaneous-interruption prevention device comprising a latch part that operates so as to come into contact with a hook button of a telephone when receiving an impact from a handset or from a push or a pull against a body or a housing of the telephone,
wherein the latch part stops motion of the hook button unless the hook button is in contact with the handset by fitting to the hook button to come into contact with the hook button in response to the impact from the handset being applied in a press direction of the hook button.

2. The instantaneous-interruption prevention device according to claim 1,
wherein the hook button is configured to swing about a first shaft, and
wherein the latch part stops motion of the hook button by fitting to the first shaft to come into contact with the first shaft.

3. The instantaneous-interruption prevention device according to claim 2,
wherein a reception part is provided to the first shaft, and wherein the latch part stops motion of the hook button by fitting to the reception part.

4. The instantaneous-interruption prevention device according to claim 2 further comprising a pull spring that causes the latch part to be separated from the first shaft when not receiving the impact.

5. The instantaneous-interruption prevention device according to claim 2, wherein the latch part is provided above the first shaft and is configured to swing about a second shaft when receiving the impact.

6. An instantaneous-interruption prevention device comprising a latch part that operates so as to come into contact with a hook button of a telephone when receiving an impact,
   wherein the hook button has a button portion exposed outside the telephone and a hook lever extending from the button portion inside the telephone, and
   wherein the latch part is provided under the hook lever and configured to swing about a second shaft when receiving the impact,
   the instantaneous-interruption prevention device further comprising:
a weight part provided on an opposite side to the latch part with respect to the second shaft as a reference,
   wherein a weight balance is set such that the weight part side is heavier than the latch part side with respect to the second shaft as a reference, and
   wherein the latch part stops motion of the hook button by coming into contact with the hook lever.

7. A telephone comprising:
a hook button; and
the instantaneous-interruption prevention device according to claim 1.

8. A telephone comprising:
a hook button; and
the instantaneous-interruption prevention device according to claim 6.

* * * * *